3,555,107
Patented Jan. 12, 1971

3,555,107
HYDROCARBON CONVERSION PROCESS WITH A CATALYST ACTIVATED WITH AN ORGANIC CHLORIDE AND OXYGEN
John H. Estes and Robert M. Suggitt, Wappingers Falls, N.Y., assignors to Texaco Inc., New York, N.Y., a corporation of Delaware
No Drawing. Continuation-in-part of application Ser. No. 636,000, May 4, 1967, which is a continuation-in-part of applications Ser. No. 428,572, Jan. 27, 1965, and Ser. No. 495,327, Oct. 12, 1965. This application Mar. 24, 1969, Ser. No. 810,031
Int. Cl. B01j 11/64; C07c 5/30; C10g 11/02
U.S. Cl. 260—683.68                    12 Claims

ABSTRACT OF THE DISCLOSURE

A hydrocarbon conversion process in which a hydrocarbon is contacted at conversion conditions with a catalyst comprising alumina and chlorine wherein at least a portion of said chlorine is introduced into said catalyst by contacting said alumina at elevated temperature with a selected organic chloride in the presence of an amount of oxygen sufficient to convert all of the carbon in said organic chloride to carbon dioxide. In addition, the catalyst may contain a metal selected from the group consisting of ruthenium, rhodium, palladium and platinum. The catalyst so prepared is useful in hydrocarbon conversion processes as isomerization, hydrocracking, alkylation, hydrogenation, and polymerization.

CROSS REFERENCE TO RELATED APPLICATIONS

This application is a continuation-in-part of our copending application Ser. No. 636,000, filed May 4, 1967, now abandoned, which in turn is a continuation-in-part of our applications Ser. No. 495,327, filed Oct. 12, 1965, now abandoned, and Ser. No. 428,572, filed Jan. 27, 1965, now abandoned.

BACKGROUND OF THE INVENTION

Highly active catalysts prepared by the activation of alumina with certain organic chloride activating agents are described in U.S. Pat. 3,240,840, in British Patent 953,187 and in application Ser. No. 419,755, filed Dec. 21, 1964. These catalysts are prepared by chloriding alumina or composites of platinum and alumina, the latter comprising a major portion of alumina and about 0.01 to 1.0% by weight platinum. The platinum is added by any of various well-known methods including for example impregnation with a water soluble platinum-containing compound such as chloroplatinic acid or precipitation of platinum as sulfide by passing hydrogen sulfide through an aqueous solution of a platinum compound. The alumina or platinum-alumina composite is thereafter activated by treatment with an organic chloride activating agent, for example, a chloroalkane corresponding to the general formula:

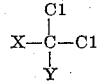

or an acid chloride under conditions effecting reaction of at least a portion of said activating agent with the alumina or at least one component of the platinized alumina composite.

Broadly, this invention contemplates a hydrocarbon conversion process which comprises contacting a hydrocarbon at conversion conditions with a catalyst comprising alumina and chlorine, said chlorine present in an amount of from about 3.0 to 12.0 weight percent of said catalyst, wherein said chlorine is introduced into said catalyst by contacting said alumina at a temperature within the range of about 300 to 800° F. with a combination of oxygen and an organic chloride containing at least two carbon atoms, said organic chloride having a mole ratio of hydrogen to chlorine less than 1.0, said organic chloride exerting a vapor pressure in excess of 1 millimeter at 400° F., said oxygen present in an amount of at least 1 gram mole of gaseous oxygen per gram atom of carbon in said organic chloride and where said amount of oxygen is sufficient to convert all of said carbon in said organic chloride to carbon dioxide.

It has now been found that organic chlorides having at least two carbon atoms which have heretofore not been known to be activating agents will in the presence of an atmosphere containing reactive oxygen render aluminas active for the conversion of hydrocarbons when contacted therewith. Additionally, the effectiveness of acid chlorides as activating agents, and particularly those acid chlorides having at least two carbon atoms, may be substantially increased by effecting contact of said activating agent and said alumina in an atmosphere containing reactive oxygen.

Organic chloride activating agents defined above and used in accordance with this invention include compounds of the general formula $$C_nH_aCl_bO_cS_d$$

where $n$ is from 2 to 5, $a$ is from 0 to 5, $b$ is from 3 to 8, $c$ is from 0 to 2 and $d$ is from 0 to 2, where $a$ is always less than $b$ and where the sum of $c$ and $d$ is not greater than 2. Included in the class of compounds falling within the above formula, we mention in particular trichloroethylene, sym-tetrachloroethane, tetrachloroethylene, pentachloroethane, hexachloroethane, pentachloropropane, hexachloropropanone-2, hexachloropropylene, octachloropropane, hexachlorobutadiene, octachlorobutanone, octachlorobutylene, heptachloropentane, hexachlorocyclopentadiene, decachloropentanone-3, decachlorobutadithione and octachlorodioxane. Acid chlorides applicable to the invention include trichloroacryloyl chloride and trichloroacetyl chloride. Highly preferred activating agents are sym-tetrachloroethane, tetrachloroethylene, hexachloroethane, hexachloropropanone-2, and hexachloropropylene.

The organic chloride activating agents employed in combination with reactive oxygen falling within the above formula, all have an atomic ratio of hydrogen to chlorine less than 1.0, and exert a vapor pressure in excess of 1 millimeter at 400° F. It is postulated that in the course of the activation procedure the carbon in the organic chloride is converted to carbon dioxide, hydrogen forms HCl with part of the chlorine and chlorine in excess of that consumed in forming the HCl reacts to affect catalyst activation. Under the same activating conditions organic compounds containing hydrogen in an atomic ratio of hydrogen to chlorine greater than 1.0, for example, ethylene chloride, ethyl chloride and dichloroethane are ineffective as activating agents either individually or in combination with oxygen. The chloride activating agent may be added in liquid form to the alumina and the mixture thereafter heated in the presence of oxygen. Although the activation may be effected in the presence of the requisite amount of oxygen and in admixture with an inert or an oxidizing gas, a reducing gas such as hydrogen is not used since activation is not achieved if the organic chloride is reduced to hydrogen chloride. The catalyst may be produced in pellet, granular, bead or pulverulent form to facilitate its use in fixed beds, moving beds or fluidized solid beds as is well known in the art. Additionally, it has been found that the activating method and agents described above are highly effective with alumina containing catalytic amounts of palladium group metals, including ruthenium, rhodium and palladium as well as with alumina containing platinum. This group includes the transition elements of Group VIII having not more than one electron in the unfilled outer shell. An advantage for the use of ruthenium is that the chloride is of relatively low volatility so that more severe activation and stabilization techniques and processing conditions may be employed.

In accordance with our method of activation, alumina or a composite containing alumina and about 0.01 to 2.0 weight percent of a palladium group metal or platinum is simultaneously contacted with oxygen and a chloride activating agent as hereinabove described to introduce within the range of about 3.0 to 12.0 percent chlorine by weight of the catalyst. Oxygen is employed in an amount of at least the stoichiometric requirement for converting the carbon present to carbon dioxide, i.e., the amount of oxygen being sufficient to convert all of the carbon in the organic chloride to carbon dioxide. In the stoichiometry of the activation reaction, we postulate that the activating agent reacts with the alumina's surface hydroxyl groups to introduce chlorine with the elimination of HCl and $CO_2$. For example, using pentachloroethane, the reaction may be expressed by the following equation:

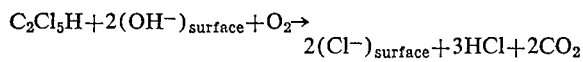

$$C_2Cl_5H + 2(OH^-)_{surface} + O_2 \rightarrow 2(Cl^-)_{surface} + 3HCl + 2CO_2$$

The aluminas contemplated for activation with the combination of organic chloride activating agent and oxygen and illustrated by the above equation are gamma or eta alumina having a surface area of from about 100 to 450 m.²/g. Aluminas possessing surface areas of about 100 m.²/g. are employed preferably in such hydrocarbon conversion reactions as alkylation; those possessing surface areas of about 150 m.²/g. are preferably employed in polymerization or hydrogenation and aluminas having surface areas of from about 250 to 400 m.²/g. are preferred in isomerization. Further, the contemplated aluminas contain from about 0.5 to 3.0, and preferably about 1.5 to 2.4, percent by weight of water present as a monolayer of hydroxyl groups on the alumina surface. One method of providing the aforementioned alumina possessing the designated surface area and percent water is by heating eta or gamma alumina in a flowing inert gaseous stream at temperatures ranging from about 800 to 1250° F. for periods of 24 to one-half hours. Such conditions are sufficient to provide the alumina with the prescribed water content without sintering the surface thereof. Composites of alumina and palladium group metal or platinum are provided with similar ranges of moisture contents by treating the composite under the conditions set out above.

The activation in the presence of the organic chloride and oxygen may proceed at atmospheric or higher pressures. Preferably, pressures in the range of about 100 to 400 p.s.i.g. are employed. The source of oxygen may be air, oxygen enriched air or oxygen gas. Contacting of the alumina or composite to be activated with the combination of activating agent and oxygen is effected at a temperature of about 300 to 800° F. Temperatures less than 300° F. are generally insufficient to provide a highly active catalyst useful for commercial size operations. On the other hand, temperatures in excess of 800° F. tend to promote the formation of aluminum chloride or other side products as, for example, the loss of platinum or other metal present and utilized in the catalyst base. Within the range above specified we prefer to employ temperatures ranging from about 500 to 675° F. The catalyst can be prepared in situ in a hydrocarbon conversion reactor by passing a stream of oxygen through a vessel maintained at the conditions of temperature and pressure indicated above containing the alumina and organic chloride. Alternatively, the organic chloride and oxygen may be added separately to the reaction zone and the activation permitted to take place under a pressurized atmosphere of oxygen at the temperatures above indicated.

The chlorided alumina catalysts prepared in accordance with this invention are highly active for alkylation at relatively low temperatures. Benzene is alkylated with ethylene in the presence of this catalyst at temperatures within the range of about 150 to 300° F. and preferably within the range of 200 to 250° F. Isobutane may be alkylated with ethylene at temperatures within the range of about 150 to 250° F. Chlorided metal-alumina catalysts, such as platinized alumina, prepared as indicated above have a high activity for the isomerization of isomerizable hydrocarbons for example, paraffinic hydrocarbons such as butanes, pentanes, hexanes, and heptanes, and naphthenic hydrocarbons such as methyl cyclopentane, cyclohexane and dimethylcyclopentane. Isomerization, for example, can be undertaken in either the liquid or vapor phase. Metal alumina catalysts prepared in accordance with this invention are also active in such additional hydrocarbon conversion reactions as hydrogenation, hydrocracking and polymerization. Hydrogenation of such feedstocks as olefins and aromatics such as benzene is undertaken at temperatures of from 250 to 400° F.; hydrocracking of $C_7$ and higher hydrocarbons is conducted at temperatures of from 250 to 400° F.; hydroisomerization is accomplished at temperatures of from 250 to 400° F.; and polymerization of ethylene or propylene is undertaken at temperatures of from about 0 to 125° F. Pressures from atmospheric and higher are applicable. The activated alumina or composite metal-alumina catalysts described above, may be stabilized and its activity further enhanced by heating the activated catalyst to a temperature of from 800 to 1000° F. in a gaseous stream inert to the system, such as hydrogen, nitrogen, helium, oxygen or argon for a period of 1 to 48 hours and thereafter contacting the catalyst with hydrogen chloride gas at temperatures of from 300 to 500° F.

In a highly preferred embodiment the chlorided platinized alumina prepared in accordance with this invention is highly active for the isomerization of hydrocarbon streams at relatively low temperatures. Streams containing $C_4$ to $C_6$ hydrocarbons such as butanes, pentanes, hexanes, cyclopentanes and cyclohexanes are isomerized at temperatures within the range of about 250 to 400° F. and preferably within the range of about 250 to 350° F. Isomerization may be effected in either the liquid or vapor phase. Pressures from atmospheric to the practical maximum as limited by materials of construction may be used and pressures within the range of 300 to 750 pounds per square inch gauge have been found convenient. A liquid hourly space velocity, i.e., the volume of liquid charge per hour per volume of catalyst within the range of about 0.5 to 10.0 and preferably within the range of about 0.75 to 4.0 is employed. Hydrogen is included in the isomerization feed and a mole ratio of hydrogen to hydrocarbon within the range of about 0.05:1 to 5:1 and preferably within the range of about 2:1 to 5:1 for pentanes and hexanes and about 0.1:1 to 1:1 for butanes.

In order to more fully illustrate the nature of our invention and manner of practicing the same the following examples are presented. In these examples the best mode contemplated by us for carrying out our invention is set forth.

EXAMPLE I

A composite of platinum and alumina is prepared by pilling beta-alumina trihydrate, calcining at 930° F. for two hours, cooling to room temperature, impregnating with an aqueous solution of chloroplatinic acid and ethylene diamine, drying and calcining at 1,050° F. for two hours. The platinized alumina composite resulting from this treatment comprises predominantly eta-alumina containing 0.6 weight percent platinum. A 200 gram portion of the platinized alumina composite is admixed with 61 grams of sym-tetrachloroethane and the mixture pressured to 55 lbs. per square inch gauge with oxygen. The mixture is heated to 500° F. and maintained at 225 to 250 pounds per square inch gauge for 12 hours. The vessel is then depressured and vented. The resulting catalyst preparations and evaluations at the hexane isomerization conditions of Example I in Table II following.

TABLE I

| Chloride activating agent | Preparation | | | | | Evaluation | | |
|---|---|---|---|---|---|---|---|---|
| | Grams of base | Grams of activating agent | Initial atmosphere | Treating temperature, °F. | Treating time, hours | Weight percent chlorine | Wt. percent yield of 2,2-dimethyl butane | Total conversion |
| Trichloroacetyl chloride (CCl₃COCl) | 100 | 40 | N₂ | 450 | 6.5 | 8.5 | 20.6 | 87.8 |
| | 100 | 40 | Air | 450 | 4 | 8.1 | 29.4 | 89.7 |

TABLE II

| Chloride activating agent | Preparation | | | | | Evaluation | | |
|---|---|---|---|---|---|---|---|---|
| | Grams of base | Grams of activating agent | Initial atmosphere | Treating temperature, °F. | Treating time, hours | Weight percent chlorine | Wt. percent yield of 2,2-dimethyl butane | Total conversion |
| Hexachloroethane (CCl₃—CCl₃) | 200 | 30 | O² | 500 | 2 | 11 | 29.0 | 90.4 |
| Hexachloropropanone-2 (CCl₃COCCl₃) | 200 | 25 | O² | 500 | 4.5 | 9.0 | 12.2 | 83.5 |
| Pentachloroethane (CCl₃CH Cl₂) | 200 | 30 | O² | 575 | 6 | 7.4 | 33.3 | 91.6 |
| Hexachlorobutadiene (CCl₂=CCl—CCl=CCl₂) | 200 | 34.5 | O² | 550 | | 5.1 | 4.2 | 69.5 |
| Tetrachloroethane (CHCl₂—CH Cl₂) | 200 | 66 | O² | 500 | 2 | 9.9 | 27.0 | 90.0 |
| | 200 | 66 | N² | 500 | 2 | 8.9 | 0 | 0 | is predominantly eta-alumina and contains 9.9 weight percent chlorine and 0.55 weight percent platinum. A portion of the thus treated catalyst is stabilized at 1,000° F. for 2 hours reducing the chlorine content to 4.8 weight percent. The stabilized catalyst is contacted with normal hexane and hydrogen at hydroisomerization conditions including a reaction temperature of 300° F., a pressure of 300 pounds per square inch gauge, a liquid hourly space velocity of 1 and a hydrogen: hydrocarbon mole ratio of 2:1 producing a yield of 90.0 weight percent branched chain hexane isomers including 27.0 weight percent 2,2-dimethylbutane.

EXAMPLE II

Another 100 gram portion of the platinized alumina composite of Example I is contacted with 15 grams of sym-tetrachloroethane and pressured with nitrogen to a pressure of 50 pounds per square inch gauge. This mixture is heated to 500° F. and a pressure 127 pounds per square inch gauge for 8 hours. The resulting catalyst is predominantly eta-alumina and contains 8.4 weight percent chlorine and 0.54 weight percent platinum. A portion of the thus activated catalyst is contacted with normal hexane at the hydroisomerization conditions of Example I and is found to be inactive to produce branch chain isomers of normal hexane.

EXAMPLE III

Two catalyst preparations are made by contacting a platinized alumina base containing 0.5 weight percent platinum with trichloroacetyl chloride, one in the presence of nitrogen and the other in the presence of air. Details of these preparations and the evaluation of the resulting catalyst for isomerization of normal hexane at the conditions of Example I are shown in Table I following. The beneficial effect of the use of an oxygen containing atmosphere where the amount of oxygen added was sufficient to convert all of the carbon in trichloroacetyl chloride to carbon dioxide as compared to the use of a nitrogen atmosphere is clearly shown.

EXAMPLE IV

The example of an oxygen atmosphere in the activation of a platinized alumina base is further shown by the preparations and evaluations at the hexane isomerization conditions of Example I in Table II following.

EXAMPLE V

Another 100 gram portion of the platinized alumina composite of Example I is contacted with 22 grams (15 cubic centimeters) of tetrachloroethylene in the following manner. The catalyst composite is enclosed in a nickel reactor and subjected to 400 p.s.i.g. of air pressure. A flow of 0.5 cubic foot per hour measured at standard conditions of 1 atmosphere pressure and 60° F. is established and the catalyst heated to 650° F. After reaching 650° F. the temperature is maintained at this level and tetrachloroethylene is added to the air stream by means of a pump at 5.0 cubic centimeters per hour for 3.0 hours. The flow of tetrachloroethylene is discontinued and the flow of air at 650° F. is continued for 45 minutes. The resulting catalyst is then evaluated for normal hexane isomerization at 300 p.s.i.g., 300° F. and 3.2:1 hydrogen to hydrocarbon mole ratio. A total conversion of 88 weight percent is obtained with a yield of 28.9 weight percent 2,2-dimethylbutane. Upon stabilization of the catalyst by heating to a temperature of 800° F. for 4 hours in the presence of hydrogen and then at 500° F. for 1 hour in the presence of hydrogen chloride gas, a conversion to branch chain isomers of 87.4 weight percent and a yield of 31.6 weight percent, 2,2-dimethylbutane are obtained. The unstabilized catalyst contained 10.0 weight percent chlorine and 0.55 weight percent platinum. The stabilized catalyst contained 7.4 weight percent chlorine and 0.55 weight percent platinum.

EXAMPLE VI

A palladium tetraamine complex is formed by dissolving 8.5 grams of palladium chloride in 55 cc. of concentrated hydrochloric acid, diluting with 900 cc. of distilled water and 115 cc. of concentrated ammonium hydroxide and heating at 140° F. with stirring for about 30 minutes until the precipitate originally formed is dissolved. The resulting solution is cooled and added to 1,711 grams of one-eighth inch eta-alumina pills in a cooling bath. After thorough mixing the pills are dried overnight at 300° F. and then calcined at 1,050° F. for 2 hours forming a composite containing 0.3 weight percent palladium. A 200 gram sample of the foregoing composite is charged to a nickel reactor, the pressure raised to 200 pounds per square inch gauge with oxygen and the temperature raised to 550° F. A stream of 5.0 cubic feet per hour of oxygen with 1.33 cubic centimeters per hour liquid measure of hexachloropropanone-2, providing a ratio substantially in excess of 1.0 moles of oxygen per atom of carbon in said hexachloropropanone-2, is established and passed over said composite for 24 hours with the temperature maintained at 550° F. Analysis of the resulting composite shows it to comprise eta-alumina, 0.27 weight percent palladium and 8.4 weight percent chlorine. When tested for isomerization activity with normal hexane at 300 pounds per square inch pressure, 300° F., 3.2:1 hydrogen-hydrocarbon ratio and at 1.0 liquid hourly space velocity, the following products are obtained with a liquid recovery in excess of 95 percent and with less than 1.0 percent cracking:

n-hexane _____ 10.2
3-methylbutane _____ 18.7
2-methylpentane and 2,3-dimethylbutane _____ 42.0
2,2-dimethylbutane _____ 29.0

EXAMPLE VII

The palladium-alumina composite of Example VI is activated at the same conditions as Example VI except that pentachloroethane is substituted for hexachloropropanone-2 to introduce 7.3 weight percent chlorine into the composite. When tested for hexane isomerization activity at the same conditions used in Example VI, the following liquid product is obtained:

n-hexane _____ 12.9
3-methylpentane _____ 21.1
2-methylpentane and 2,3-dimethylbutane _____ 42.3
2,2-dimethylbutane _____ 23.7

EXAMPLE VIII

A rhodium composite containing 0.4 weight percent rhodium is prepared by the method of Example VI and is chlorided by treatment with hexachloropropanone-2 and evaluated for hexane isomerization at the conditions of Example VI to produce the following product:

n-hexane _____ 16.0
3-methylpentane _____ 21.7
2-methylpentane and 2,3-dimethylbutane _____ 45.4
2,2-dimethylbutane _____ 17.0

EXAMPLE IX

A composite of platinum and alumina comprising 0.47 weight percent platinum on one-sixteenth inch eta-alumina extrudate having a surface area of 220 m.²/g. was calcined at a temperature of 900° F. such that the composite possessed a water content of 2.5 weight percent present as a mono-layer of hydroxyl groups on the composite's surface. 200 grams of this composite was mixed with 30 grams of hexachloroethane and charged to a pressure vessel under 30 p.s.i.g. of oxygen pressure. The stoichiometry of this activation reaction is postulated according to the following equation:

$$C_2Cl_6 + 3OH^- + 1/2 O_2 \rightarrow 3Cl^- + 3HCl + 2CO_2$$

The vessel was heated to 600° F. and held until the pressure generated equilibrated. The reactor was then cooled, depressurized and the activated catalyst stabilized by heating to 800° F. in a stream of hydrogen flowing at the rate of 5 cubic feet per hour for 4 hours and thereafter treated with HCl at the rate of one-half cubic foot per hour at 500° F. for 2 hours at atmospheric pressure. The chlorine content of the so activated and stabilized catalyst was 7.6 weight percent.

The stabilized catalyst prepared above, was contacted with normal hexane and hydrogen at hydroisomerization conditions including a reaction temperature of 300° F., a pressure of 300 pounds per square inch gauge, a liquid hourly space velocity of one and a hydrogen:hydrocarbon mole ratio of 3.2/1. The charge stock contained 10 volume percent of 99.9 weight percent n-dodecane in n-hexane. Table III compares the composition of the charge stock with the respective product streams.

TABLE III

| | Charge n-hexane | Hexane product | 10% n-dodecane charge | Dodecane product |
|---|---|---|---|---|
| $C_3$ | | Trace | | 0.4 |
| $C_4$ | | 0.3 | | 3.7 |
| n-$C_4$ | | Trace | | 0.3 |
| $C_5$ isomers | | 0.2 | | 1.8 |
| n-$C_5$ | | | | 0.3 |
| 2,2-dimethylbutane | | 24.9 | | 17.8 |
| 2,3-dimethylbutane | | 9.3 | | 9.2 |
| 2-methylpentane | Trace | 31.0 | | 30.2 |
| 3-methylpentane | 2.4 | 17.6 | 2.2 | 17.5 |
| n-$C_6$ | 89.0 | 11.1 | 80.0 | 11.7 |
| Methylcyclopentane | 8.6 | 3.1 | 7.8 | 4.0 |
| Cyclohexane | | 2.4 | | 2.7 |
| $C_7$+ | | | | 0.1 |
| $C_{12}$ | | | 10 | |

From the above tabulation it will be seen that the catalyst not only possesses substantial isomerization activity but additionally hydrocracking activity.

EXAMPLE X

The catalyst of the preceding example was evaluated for hydrogenation activity by employing a charge stock comprising 10% cyclohexane in n-hexane. The charge stock was passed over the catalyst at 300° F., 300 p.s.i.g., at a hydrogen to hydrocarbon mole ratio of 3.2:1 and a liquid hourly space velocity of 1.0. Table IV compares the composition of the charge with the product stream.

TABLE IV

| | Cyclohexene-n hexane charge | Product |
|---|---|---|
| 2,2-dimethylbutane | | 7.9 |
| 2,3-dimethylbutane | | 8.0 |
| 2-methylpentane | 0.1 | 28.5 |
| 3-methylpentane | 2.7 | 16.8 |
| n-$C_6$ | 78.3 | 18.0 |
| Methylcyclopentane | 8.8 | 10.7 |
| Cyclohexane | | 9.6 |
| Cyclohexene | 10.0 | |
| $C_7$+ | | 0.3 |

As can be seen from the product distribution above, the cyclohexene added to the charge is both hydrogenated and isomerized to give an equilibrium mixture of $C_6$ isomers.

EXAMPLE XI 259 grams of eta-alumina pills were mixed with 22 cc. of tetrachloroethylene in a pressure vessel and heated to 600° F. under an initial oxygen pressure of 100 p.s.i.g. After the pressure had equilibrated, the reactor was held at a temperature of 600° F. for an additional hour. The catalyst possessed a chlorine content of 9.7 weight percent. This catalyst was evaluated for activity in the alkylation of benzene with ethylene under the following conditions: 200° F., 200 p.s.i.g., liquid hourly space velocity of 1.5 with a benzene to ethylene mole ratio of 10:1. The product analysis showed 96.5 percent benzene, 3.0 percent ethylbenzene and 0.1 heavier materials corresponding to 24 percent conversion of ethylene and a selectivity of 96.8 to ethylbenzene. By operating at higher pressures such as 700 p.s.i.g., conversion can be increased to about 35 percent.

We claim:
1. A hydrocarbon conversion process which comprises contacting a hydrocarbon at a temperature of from about 0 to 400° F. with a catalyst comprising alumina and chlorine, said chlorine being present in an amount of from about 3.0 to 12.0 weight percent of said catalyst, wherein said chlorine is introduced into said catalyst by contacting said alumina at a temperature within the range of about 300 to 800° F. with a combination of oxygen and an organic chloride containing at least two carbon atoms, said organic chloride having a mole ratio of hydrogen to chlorine less than 1.0, said organic chloride exerting a vapor pressure in excess of 1 millimeter at 400° F., said oxygen being present in an amount of at least 1 gram mole of gaseous oxygen per gram atom of carbon in said organic chloride and where said amount of oxygen is sufficient to convert all of said carbon in said organic chloride to carbon dioxide.

2. A process according to claim 1 wherein said catalyst contains from about 0.01 to about 2.0 weight percent of a metal selected from the group consisting of rhodium, ruthenium, palladium and platinum.

3. A process according to claim 1 wherein said organic chloride is selected from the group consisting of sym-tetrachloroethane, tetrachloroethylene, pentachloroethane, hexachloroethane, hexachloropropanone-2, hexachloropropylene and hexachlorobutadiene.

4. A process according to claim 1 wherein said hydrocarbon conversion process is alkylation wherein said conversion is carried out at a reaction temperature within the range of about 150 to 300° F.

5. A process according to claim 2 wherein said hydrocarbon conversion process is isomerization wherein said conversion is carried out at a reaction temperature within the range of about 250 to 400° F.

6. A process according to claim 2 wherein said hydrocarbon conversion process is isomerization said hydrocarbon contains from 4 to 6 carbon atoms and said conversion is carried out at a reaction temperature within the range of about 250 to 350° F., a liquid hourly space velocity within the range of about 0.5 to 10.0 volumes of liquid hydrocarbon feed per volume of catalyst and a hydrogen to hydrocarbon feed mole ratio within the range of about 0.05:1 to 5:1.

7. A method of preparing a catalyst comprising alumina and chlorine, said chlorine present in an amount of from about 3.0 to 12.0 weight percent of said catalyst, which comprises contacting said alumina at a temperature within the range of about 300 to 800° F. with a combination of oxygen and an organic chloride containing at least two carbon atoms, said organic chloride having a mole ratio of hydrogen to chlorine less than 1.0, said organic chloride exerting a vapor pressure in excess of 1 millimeter at 400° F., said oxygen present in an amount of at least 1 gram mole of gaseous oxygen per gram atom of carbon in said organic chloride and where said amount of oxygen is sufficient to convert all of said carbon in said organic chloride to carbon dioxide.

8. A method according to claim 7 wherein said catalyst contains from about 0.01 to 2.0 weight percent of a metal selected from the group consisting of rhodium, ruthenium, palladium and platinum.

9. A method according to claim 7 wherein said organic chloride is selected from the group consisting of sym-tetrachloroethane, tetrachloroethylene, pentachloroethane, hexachloroethane, hexachloropropanone-2, hexachloropropylene and hexachlorobutadiene.

10. A method according to claim 7 wherein said alumina is contacted with said organic chloride at a pressure of about 100 to 400 p.s.i.g.

11. A method according to claim 7 wherein said alumina is contacted with said organic chloride at a temperature of about 500 to 675° F.

12. A method according to claim 7 wherein said catalyst contains from about 0.01 to 2.0 weight percent platinum and where said organic chloride is tetrachloroethylene.

References Cited

UNITED STATES PATENTS

| | | | |
|---|---|---|---|
| 3,242,229 | 3/1966 | Estes | 208—139 |
| 3,248,320 | 4/1966 | White et al. | 208—139 |
| 3,239,577 | 3/1966 | Bloch et al. | 260—683.68 |
| 3,347,779 | 10/1967 | Groenendaal et al. | 208—143 |
| 3,440,300 | 4/1969 | Estes et al. | 260—683.68 |
| 3,379,641 | 4/1968 | Hayes | 260—683.68 |
| 3,419,503 | 12/1968 | Giannetti et al. | 260—683.68 |

FOREIGN PATENTS

| | | | |
|---|---|---|---|
| 976,941 | 12/1964 | Great Britain | 260—683.68 |

DELBERT E. GANTZ, Primary Examiner

G. J. CRASANAKIS, Assistant Examiner

U.S. Cl. X.R.

208—115, 143; 252—441; 260—671